(12) United States Patent
Komiya et al.

(10) Patent No.: US 8,220,243 B2
(45) Date of Patent: Jul. 17, 2012

(54) CABLE PROTECTION AND GUIDE DEVICE

(75) Inventors: Shoichiro Komiya, Osaka (JP);
Katsuhide Yamashita, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 36 days.

(21) Appl. No.: 12/847,179

(22) Filed: Jul. 30, 2010

(65) Prior Publication Data

US 2011/0030330 A1 Feb. 10, 2011

(30) Foreign Application Priority Data

Aug. 6, 2009 (JP) .................................. 2009-183598

(51) Int. Cl.
*F16G 13/16* (2006.01)

(52) U.S. Cl. ................ 59/78.1; 248/49; 248/51; 59/900

(58) Field of Classification Search .................... 59/78.1; 248/49, 51
See application file for complete search history.

(56) References Cited

U.S. PATENT DOCUMENTS

| 6,067,788 | A * | 5/2000 | Weber | 59/78.1 |
| 6,176,072 | B1 * | 1/2001 | Weber | 59/78.1 |
| 6,925,795 | B2 * | 8/2005 | Komiya | 59/78.1 |
| 7,249,452 | B2 * | 7/2007 | Komiya | 59/78.1 |
| 7,526,910 | B2 * | 5/2009 | Komiya | 59/78.1 |
| 7,536,849 | B2 * | 5/2009 | Wehler et al. | 59/78.1 |

FOREIGN PATENT DOCUMENTS

JP           01152958           10/1999

* cited by examiner

*Primary Examiner* — David B Jones
(74) *Attorney, Agent, or Firm* — Woodling, Krost and Rust

(57) ABSTRACT

The invention provides a cable protection and guide device that steadily protects and guides a cable by rigidly anchoring and preventing a connecting arm from being disengaged upwardly. The device smoothly flexes and reduces torsional deformation. The hinged connecting arm extends across the flexional outer peripheral side of a pair of spaced apart right and left link plates and has a hook portion at one end of an arm body and a hinge portion at another end. An engaging circular arc portion of the hook portion engages with an engaging shaft of the link plate. Engaging projecting portions extend from the edge of the engaging circular arc portion and interengage with engaging step portions provided on the engaging shaft.

14 Claims, 14 Drawing Sheets

CABLE PROTECTION AND GUIDE DEVICE

CROSS REFERENCE TO RELATED APPLICATIONS

This application claims the foreign priority benefit under Title 35, United States Code, §119(a)-(d) of Japanese Patent Application No. 2009-183598, filed on Aug. 6, 2009 in the Japan Patent Office, the disclosure of which is herein incorporated by reference in its entirety.

BACKGROUND OF THE INVENTION

1. Field of the Invention

The present invention relates to a cable protection and guide device for securely protecting and guiding a flexible cable and/or hose. The cable or hose may be an electrical cable, optical fiber cable, and fluid supplying hose. The cable or hose may be used in machine tools, electronic devices, construction machines, industrial robots, carrier devices and others to feed electricity, fluid and air and to transmit signals or the like to a moving part thereof.

2. Related Art

The related art discloses a cable or the like protecting and guiding device having a large number of link frames each composed of a pair of right and left link plates. A connecting plate is suspended across the flexional inner peripheral side of the link plates and a connecting arm is suspended across the flexional outer peripheral side of the link plates. The connecting plates in combination with the link plates form a rectangular cable storing space and linked flexibly from each other by means of link pins and link pin holes provided in the link plates.

As shown in FIGS. 14 and 15, this known cable or the like protection and guiding device is disclosed in Japanese Utility Model Hei. 01-152958 (Page 1, FIGS. 1 and 2). For example, the reference discloses the pair of right and left link plates 510, 520 with the connecting plate 530 suspended across the flexional inner peripheral sides of the link plates. Link frame 501 forms a rectangular cable storing space by removably suspending the connecting arm 540 across the flexional outer peripheral sides of the link plates. Flexibly linking a plurality of link frames 501 to each other with link pins 521 and link pin holes 512, 522 provided in the link plates 510 and 520 enables the formation of an elongated rectangular cable storing space.

The connecting arm 540 is provided with a hook portion 541 on the both ends thereof. The hook portions 541 are formed so as to engage with engaging shafts 513 and 523 provided on the flexional outer peripheral side of the pair of right and left link plates 510, 520. That is, as shown in FIG. 14, one hook portion 541 is engaged with engaging shaft 513 so as to form a hinge enabling engagement of the other hook portion 541 with the engaging shaft 523. Connecting arm 540 is suspended across the flexional outer peripheral side of the pair of right and left link plates 510, 520.

Further, connecting arm 540 is anchored to the pair of right and left link plates 510, 520 by engaging the hook portions 541 with the engaging shafts 513, 523 and by abutting edge sides of the hook portions 541 with edge surface abutting walls 514, 524 provided on the outer sides of engaging shafts 513, 523 of the pair of right and left link plates 510, 520. Abutting both side surfaces of the hook portions 541 with side abutting walls 514, 524 provided on the both sides of the engaging shafts 513, 523 of the pair of right and left link plates 510, 520 securely fastens connecting arm 540 to the side walls 510, 520.

However, because the pair of right and left link plates 510, 520 are anchored only by the engagement of the hook portions 541 with the engaging shafts 513, 523, the abutment of the edge sides of the hook portions 541 with the end surface abutting walls 514, 524 and the abutment of both sides of the hook portions 541 with the side abutting walls 515, 525, the connecting arm 540 is prone to be disengaged upwardly. Connecting arm 540 is not well anchored and when the cable or the like moves within the cable storing space and presses against the connecting arm 540 upwardly the connecting arm may disengage and come loose thus defeating the purpose of the cable protection and guide device.

If the force applied by the cable twists the link frame 501, i.e., it is difficult for the connecting arm 540 to resist the twisting force applied by the cable because the pair of right and left link plates 510, 520 are just anchored with hook portions 541 whose width is narrow (in the longitudinal direction of the cable protection and guide device). In the related art device, the link frame 501 is prone to be twisted and deformed.

SUMMARY OF THE INVENTION

Accordingly, the present invention rigidly anchors and prevents the connecting arm from being disengaged upwardly. The present invention reduces torsional deformation.

Means for Solving the Problems

The problems are solved by the provision of a cable protection and guide device which includes:
- a large number of link frames, each composed of:
- a pair of right and left spaced apart link plates;
- a connecting plate extending across the flexional inner circumferential side (inner peripheral side) of the link plates:
- a connecting arm extending across the flexional outer circumferential side (outer peripheral side) of the link plates;
- a rectangular cable storing space formed by the link frames which are flexibly linked to each other by means of link pins and link pin holes provided in the link plates;
- the connecting arm has an arm body, a hook portion provided at a first end of the arm body and engaging the left link plate and a hinge portion provided at a second end of the arm body and engaging the right link plate;
- the hook portion has an engaging circular arc portion that is formed into the shape of a circular arc having a cut therein;
- the hook portion engages an engaging shaft provided in the left link plates;
- the engaging shaft extends in the longitudinal direction;
- the hook portion includes engaging projecting portions that extend from the engaging circular arc portion thereof;
- and, the engaging projection portions of the hook shaped portion engage with engaging step portions of the engaging shaft of the left link plates.

The left link plate has side abutting walls. Edges of the engaging projecting portions of the hook portion of the connecting arm abut the side abutting walls of the left link plate. The engaging protection portions of the hook portion also engage the engaging step portions provided on the engaging shaft of the left link plate.

The hinge portion of the connecting arm is formed into the shape of a circular arc having a cut at the ringed upper park to engage with the engaging shaft of the right link plate.

The arm body is formed to have a width wider than that of the hook portion and hinge portion. The arm body is interposed with the hook portion and hinge portion. Neck portions whose width is equal to that of the hook portion and hinge portion are integrally interposed between the arm body and the hinge and hook portions. The neck portions are not as thick as arm body. The right and left link plates each have end surface abutting walls. The end surfaces of the arm body on the sides of the hook portion and hinge portion abut the end surface abutting walls of the left and right link plates, respectively. The right and left link plates have fitting grooves whose width is substantially equal to that of the hook portion. hinge portion and neck portions. The hook portion and hinge portion may be inserted into the respective fitting grooves of the link plates.

The arm body has a projecting convex portion on the hinge side which abuts with the end surface abutting wall of the right link plates.

The connecting plate is formed together with the pair of right and left spaced apart link plates.

The right or left plate may be used with the hook portion or with the hinge portion. The hook portion has been described in connection with the left link plate and the hinge portion has been described in connection with the right link plates. However, the hook portion could engage the left side plates.

Advantageous Effects of the Invention

The cable protection and guide device has a large number of link frames. Each link frame includes a pair of spaced apart right and left link plates. Each link frame includes a connecting plate extending across the flexional inner peripheral side of the link plates. Each link frame includes a connecting arm extending across the flexional outer peripheral side of the link plates. A rectangular cable storing space is formed by the link frames together with the respective connecting plates and connecting arms.

The link frames are flexibly linked to each other by means of link pins and link pin holes provided in the link plates. Each of the connecting arms has an arm body having a hook portion and a hinge portion. The hook portion is at a first end of the arm body and engages with the left link plate.

The hinge portion is at the second end of the arm body and engages the right link plate. The hook portion of the connecting arm has an engaging circular arc portion that is formed into the shape of a circular arc having the cut at the ringed lower part. The hook portion of the connecting arm engages with the engaging shaft provided in the left link plate. The engaging shaft of the left link plate extends in the longitudinal direction.

Engaging projecting portions are provided and extend from the engaging circular arc portion of the hook portion. Engaging projecting portions engage the engaging step portions provided on the engaging shaft. Engaging step portions of the left link plate engage with the engaging projecting portions of the hook portion of the connecting arm allowing the connecting arm to rigidly resist movement or dislocation against an upward pressure applied to the connecting arm. Accordingly, it is an advantageous effect of the invention to prevent the connecting arm from being disengaged upwardly from the left link plate and to steadily protect and guide the cable within the cable storing space.

The engaging projecting portions extend from the engaging circular arc portion of the hook portion of the connecting arm and engage the engaging step portions of the engaging shaft of the left link plate. The connecting arm is anchored to the left link plate by the engaging projection portions which are wider than the width of the engaging circular arc portion of the hook portion. The strong and wide connection of the connecting arm to the left link plate creates an advantageous effect, namely, the connection enables the cable protection device to resist a large twisting force when the cable protection device is twisted.

The left link plate has side abutting walls which engage the engaging projecting portions of the hook portion. Engaging step portions provided on the engaging shaft of the left link plate engage the engaging projecting portions of the hook portion. The engagement of the hook portion and the left link plate create an advantageous effect, namely, the reduction of any torsional deformation of the link frame which would otherwise occur in the event the cable protection and guide device is twisted.

The hinge portion is formed into the shape of a circular arc having the cut (an opening) at the ringed upper part. The circular arc of the hinge portion engages the engaging shaft of the right link plate. The hinge portion will never be disengaged by an upward pressure applied to the connecting arm when the connecting arm is anchored to the link plate because the closed portion of the hinge resides under the engaging shaft. Thus, the advantageous effect is produced, namely, that the cable is steadily protected and guided while upward disengagement of the connecting arm is prevented.

The arm body is formed to have a width wider than that of the hook portion and hinge portion. The connecting arm includes an arm body, a hook portion, a hinge portion and neck portions interposed between the arm body and the hook and hinge portions. The neck portions have widths equal to the hook portion and the hinge portion. The neck portions have thicknesses less than that of the arm body. The pair of right and left link plates have end surface abutting walls with which end surfaces of the arm body on the sides of the hook portion and hinge portion abut. The end surface abutting walls of each of the right and left link plates have fitting grooves whose width is substantially equal to that of the hook portion, hinge portion and neck portion and into which the hook portion, the hinge portion and the neck portions are inserted. The wide end surfaces of the arm body abut with the end surface abutting walls and counteract twisting forces. The sides of the hook portion and hinge portion abut with the respective fitting groove and counteract against twisting forces. Thus, an additional advantageous effect is produced, namely, it is possible to further reduce the torsional deformation of the link frames and to smoothly flex the cable protection and guide device.

The hinge portion of the arm body has a convex projecting portion which abuts the end surface abutting wall of the right side link plate. The hinge portion is slightly deformed when force is applied in the direction of the engaging shaft. The hinge-side end surface of the arm body strongly abuts with the end surface abutting wall.

The connecting plate is formed integrally with a pair of right and left link plates. Because of the integral formation of the connecting plate with the pair of right and left link plates, the cable protection and guide device can withstand a large torsional force on the flexional inner peripheral side. Thus, the advantageous effect is produced, namely, it is possible to further reduce the torsional deformation of the link frame and to smoothly flex the cable protection and guide device.

DESCRIPTION OF THE INVENTION

The device has a large number of link frames each composed of a pair of right and left spaced apart link plates. A connecting arm extends across the flexional outer peripheral side of the link plates and a connecting plate is suspended across the flexional inner peripheral side of the link plates. The link frames, connecting plates and connecting arms form a rectangular cable storing space. The link frames are linked flexibly to each other by means of link pins and link pin holes provided in the link plates.

The connecting arm has an arm body. A hook portion provided at a first end of the arm body engages the left link plate. A hinge portion provided at a second end of the arm body engages the right link plate. The hook portion has an engaging circular arc portion that is formed into the shape of a circular arc having a cut at the ringed lower part which engages an engaging shaft provided in the left link plate. The engaging shaft extends in the longitudinal direction of the link frames which are interconnected together.

Engaging projecting portions of the hook portion of the connecting arm extend from the edges of the engaging circular arc portion. The engaging protection portions engage with engaging step portions provided on the engaging shaft and are capable of preventing the connecting arm from being disengaged upward by rigidly anchoring the connecting arm.

The link plates of the cable protection and guide device of the invention may be metal such as steel, aluminum and stainless steel. The surface of the metal may be painted or treated by plating. Alternatively, the link plates may be made of a resin.

The connecting arm of the cable protection and guide device of the invention may be metal such as steel, aluminum and stainless steel whose surface is painted or treated by plating. A resin material may also be used for the connecting arm. All materials used for the hook portion and hinge portion must be elastically deformable.

Figure 1:
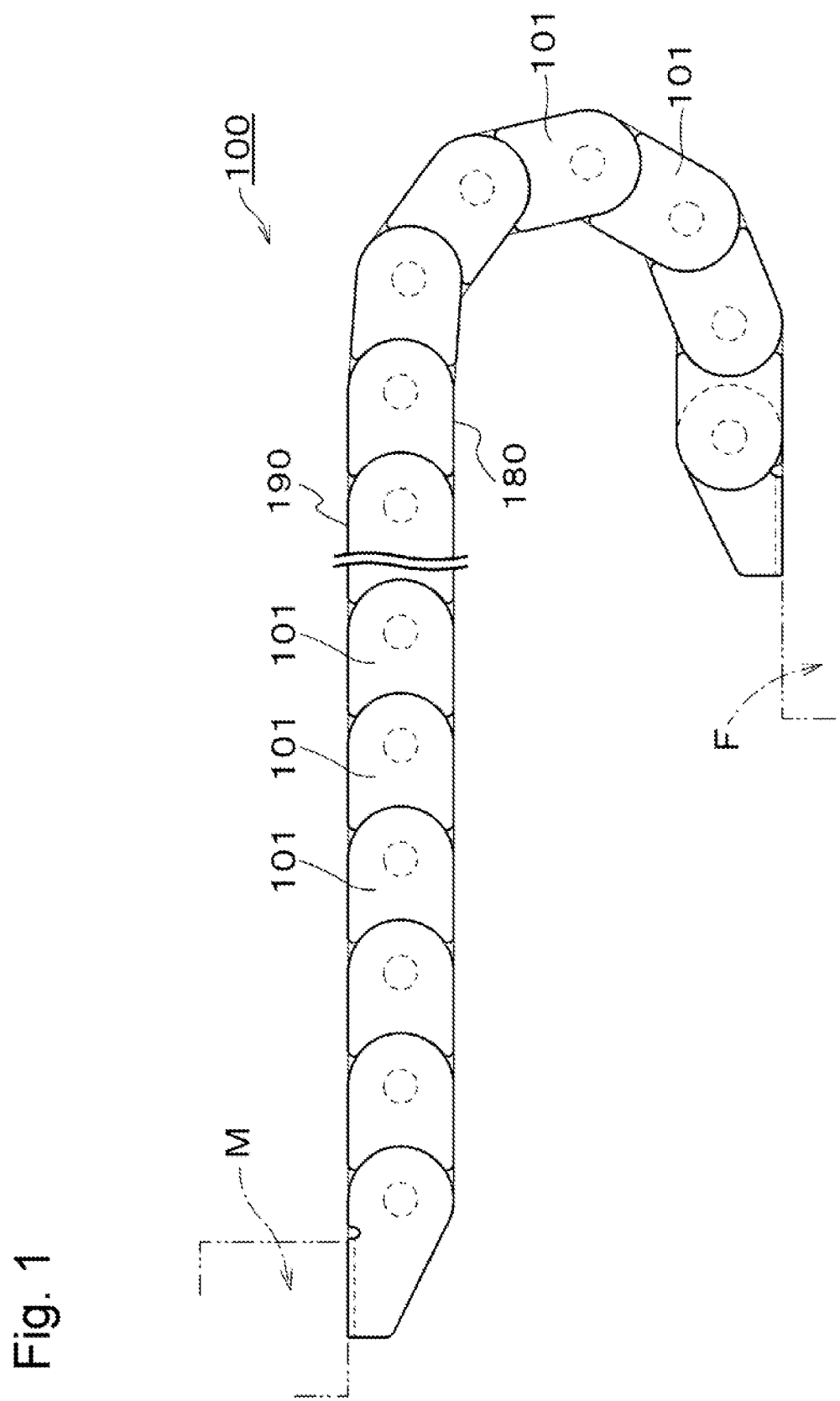
FIG. 1 is a side view of a cable protection and guide device.

The cable protection and guide device of the invention will be explained below with reference to the drawings. The cable protection and guide device 100 of one embodiment of the invention is used to protect and guide a cable, such as an electrical cable and optical fiber cable for transmitting signals and feeding electricity and/or a hose for feeding hydraulic and air pressures, that connects a movable part M with a static part F in machine tools, electronic devices, construction machines, industrial robots, carrier devices and others for example as shown in FIG. 1.

The cable protection and guide device 100 includes a large number of link frames 101 each composed of a pair of right and left spaced apart link plates. A connecting arm extends across the flexional outer peripheral side of the link plates and a connecting plate is formed as part of the inner peripheral side of the link plates. A rectangular cable storing space is formed by link frames flexibly connected to each other by means of link pins and link pin holes provided in the link plates. The device 100 assumes a linear stand state or a flexible stand state corresponding to a moving state between the movable part M and the stationary part F while inserting the cable within the cable storing space.

Figure 2:
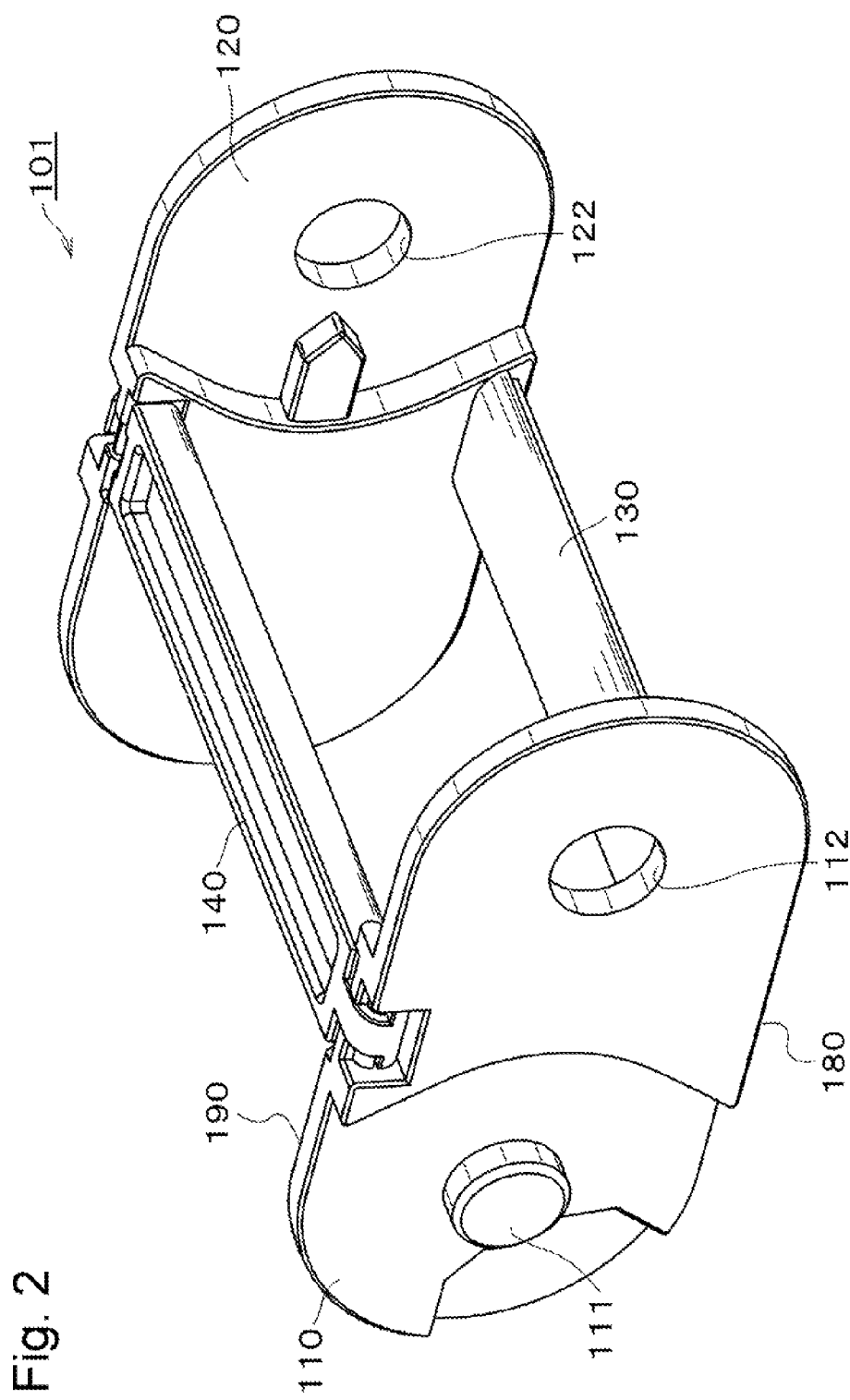
FIG. 2 is a perspective view of a link frame of the cable protection and guide device according to one embodiment of the invention.

As shown in FIG. 2, the link frame 101 is composed of a pair of right 120 and left 110 link plates spaced apart. A connecting plate 130 is integrally formed across the flexional inner peripheral side 180 of the pair of right 120 and left 110 link plates and a connecting arm 140 is removably extended across the flexional outer peripheral side 190 of the pair of right 110 and left 120 link plates. The plates 130, arms 140, and a number of link frames form the rectangular cable storing space.

The pair of right 120 and left 110 link plates are provided with link pins 111 and 121 and link pin holes 112 and 122 respectively in the longitudinal direction and the plurality of link frames 101 are linked flexibly to each other by fitting these link pins 111 and 121 into the link pin holes 112 and 122.

Figure 3:
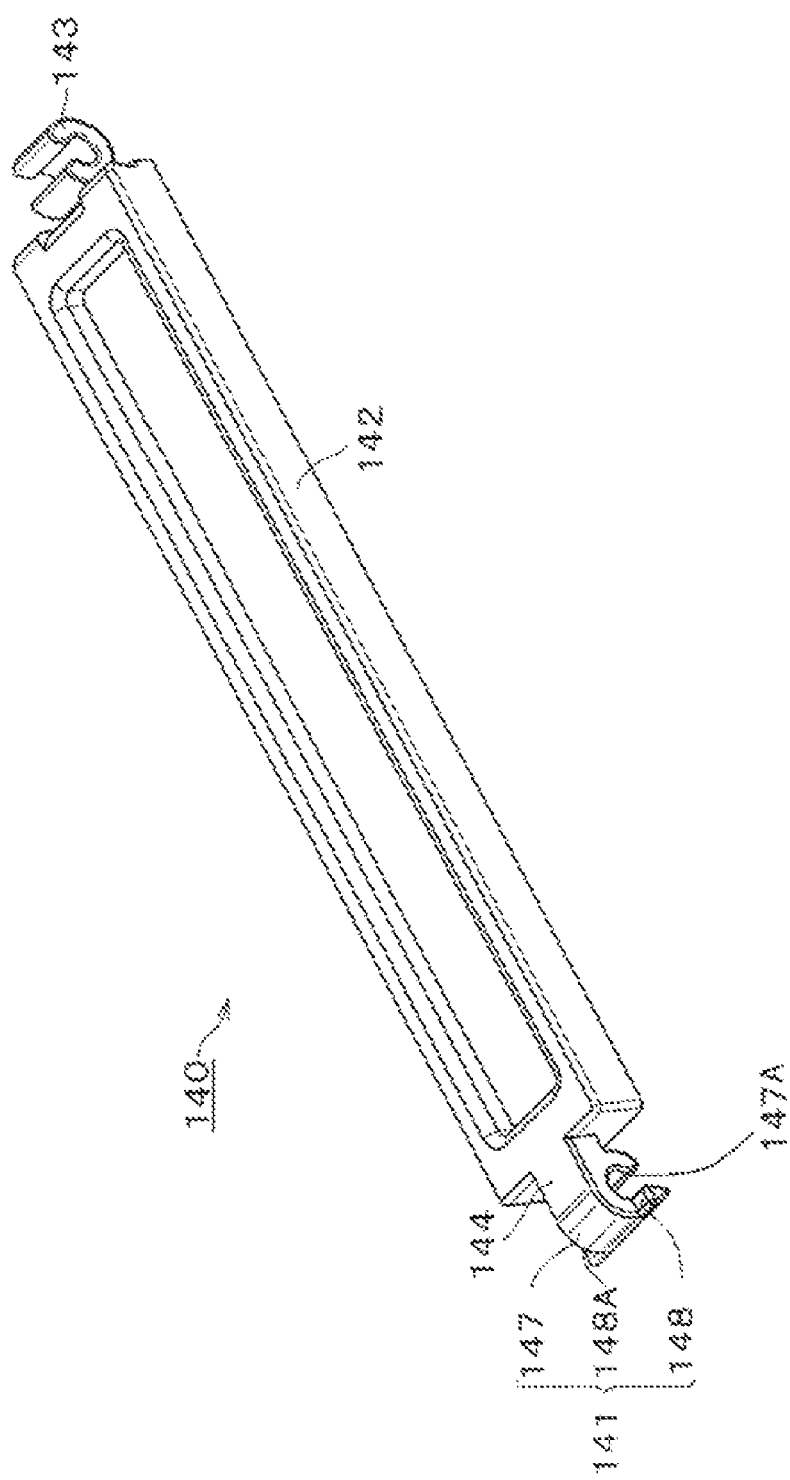
FIG. 3 is a perspective view of a connecting arm of the link frame in FIG. 2.
Figure 4:
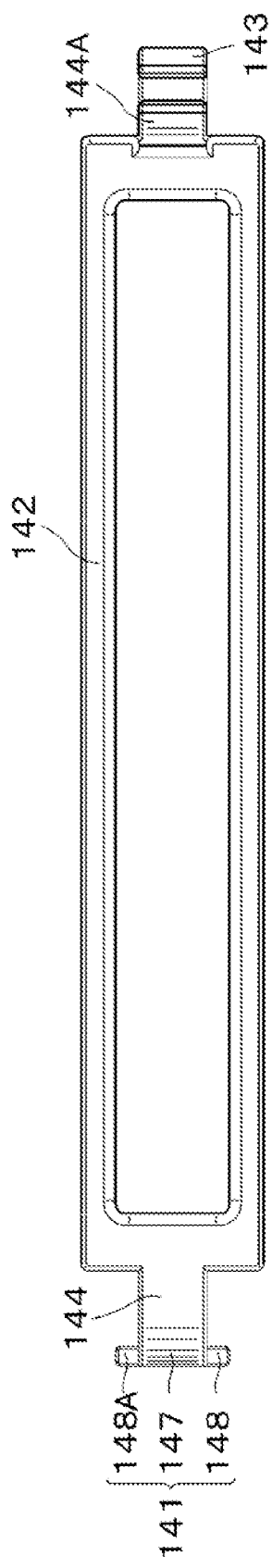
FIG. 4 is a plan view of the connecting arm in FIG. 3.
Figure 5:
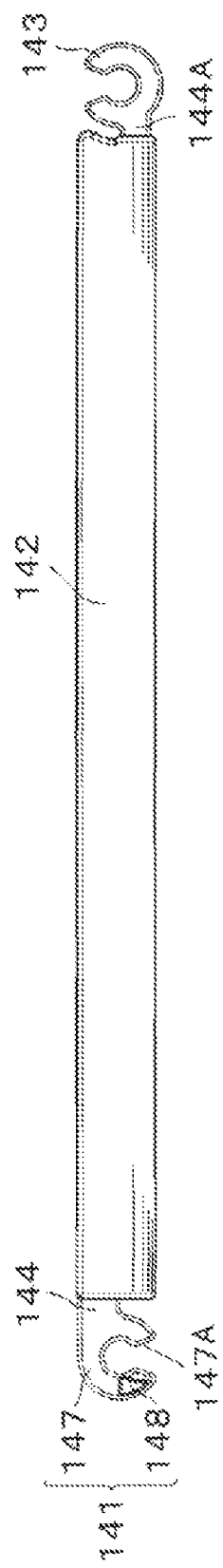
FIG. 5 is a side view of the connecting arm in FIG. 3.

As shown in FIGS. 3 through 5, the connecting arm 140 includes an arm body 142 and a hook portion 141 that is provided at a first end of the arm body 142. A neck portion 144 is also shown. The hook portion engages with left link plate 110. A hinge portion 143 is provided at a second end of the arm body 142. A neck portion 144A is also shown. The hinge portion engages the right link plate 120.

Figure 6:
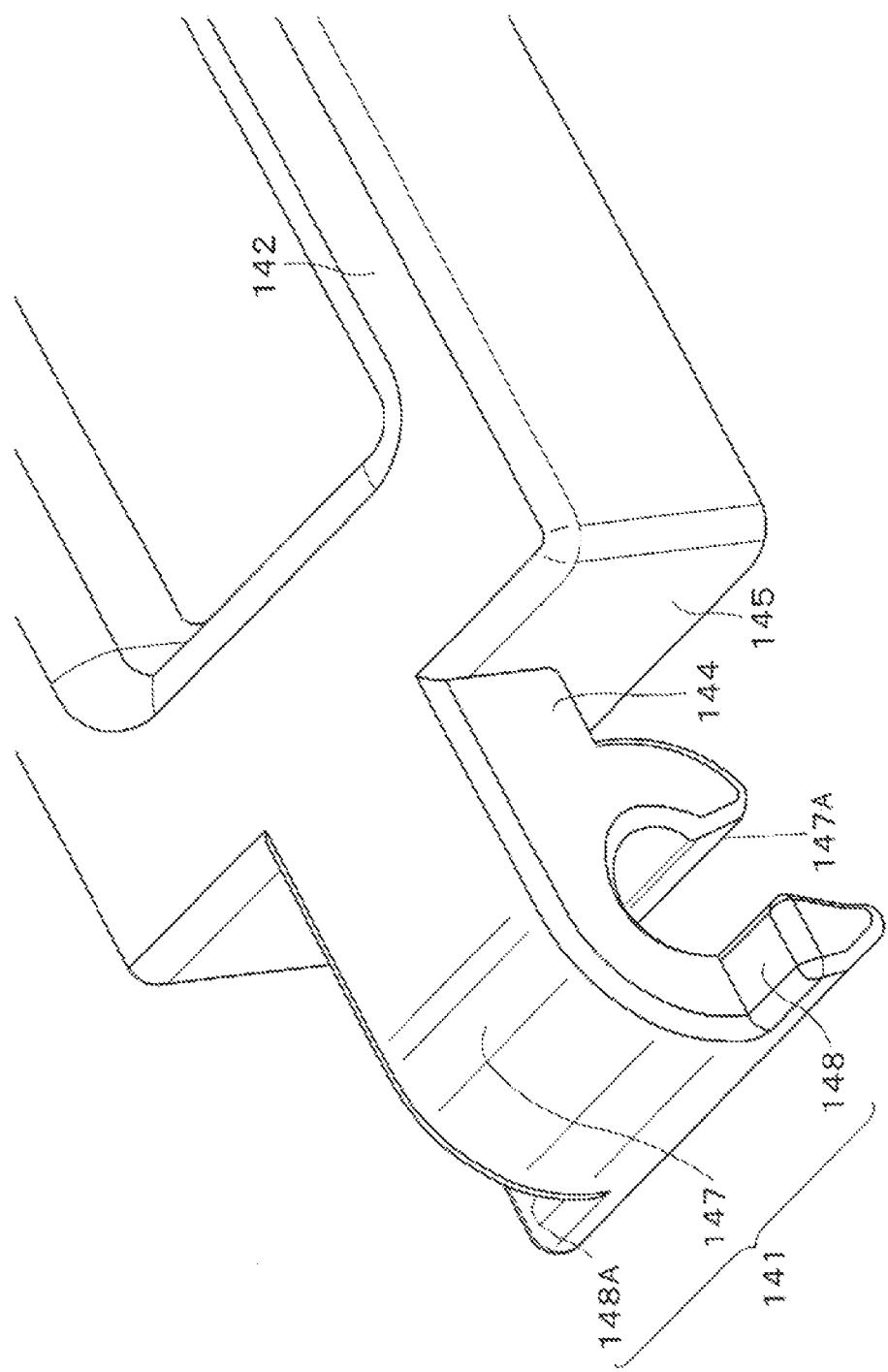
FIG. 6 is an enlarged perspective view of the hook portion of the connecting arm in FIG. 3.

As shown in FIG. 6, the hook portion 141 is provided so as to protrude from end surface 145 of the arm body 142. A neck portion 144 is also illustrated as interposed between the arm body and the hook portion 141. The hook portion includes an engaging circular arc portion 147 formed into the shape of a circular arc having a cut at the ringed lower part. The hook portion further includes engaging projecting portions 148, 148A extending from the engaging circular arc portion 147.

The hook portion 141 is formed such that the width (in the longitudinal direction of the device 100) of the engaging circular arc portion 147 is equal to that of the neck portion 144 and is narrower than that of the arm body 142. The thickness (in the vertical direction of the device 100) of the neck portion 144 is less than the thickness of the arm body 142.

Figure 7:
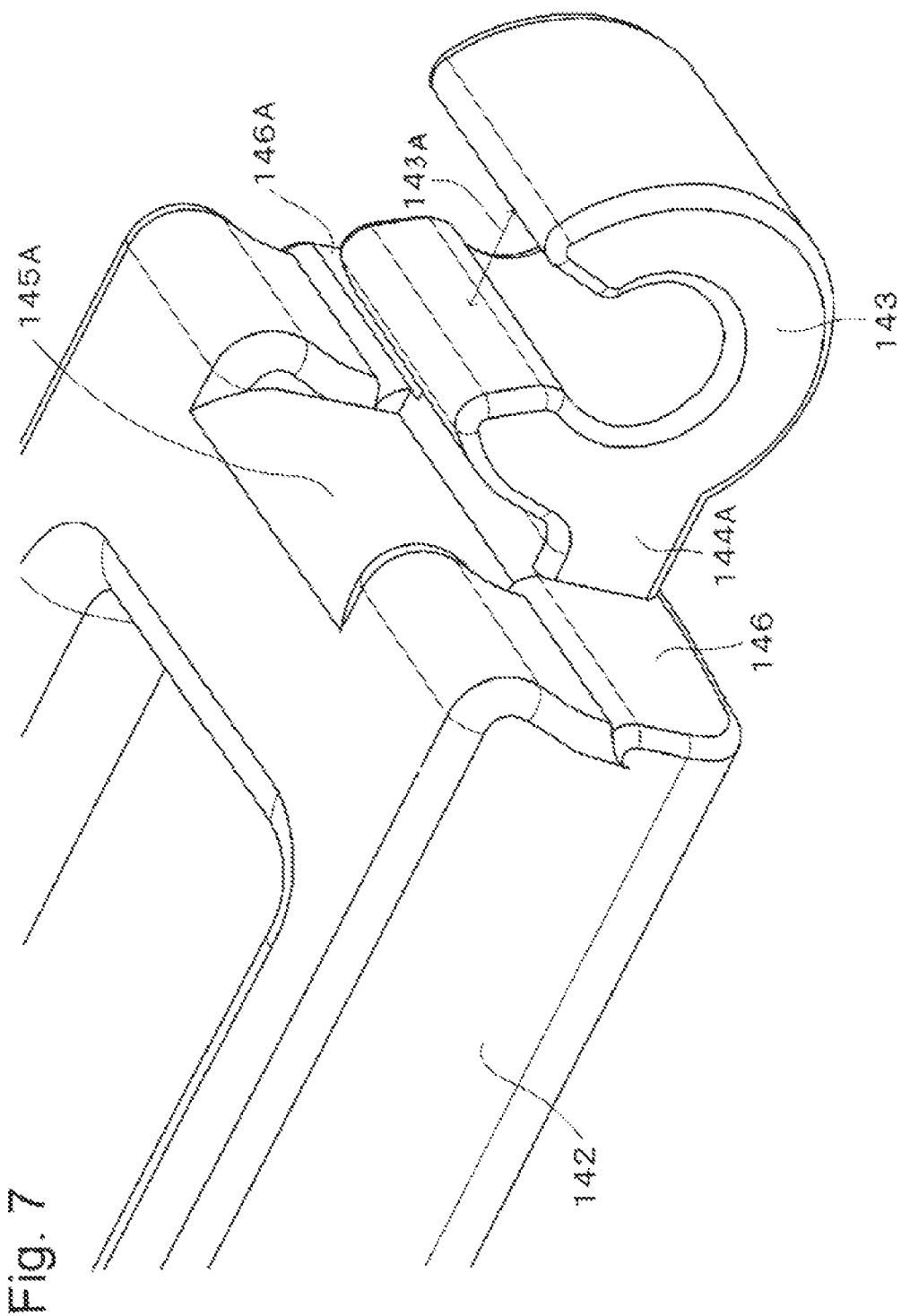
FIG. 7 is an enlarged perspective view of a hinge portion of the connecting arm in FIG. 3.

As shown in FIG. 7, the hinge portion 143 is formed into the shape of a circular arc having a cut at the ringed upper part and protrudes from the second end surface 145A of the arm body 142 through the neck portion 144A. The arm body 142 includes convex portions 146, 146A projecting toward hinge portion 143 on both sides of the neck portion 144A.

The hinge portion 143 is formed such that the width (in the longitudinal direction of the device 100) of the hinge portion 143 is equal to that of the neck portion 144A and is narrower than that of the arm body 142. The thickness (in the vertical direction of the device 100) of the neck portion 144A is less than the thickness of the arm body 142.

Figure 8:
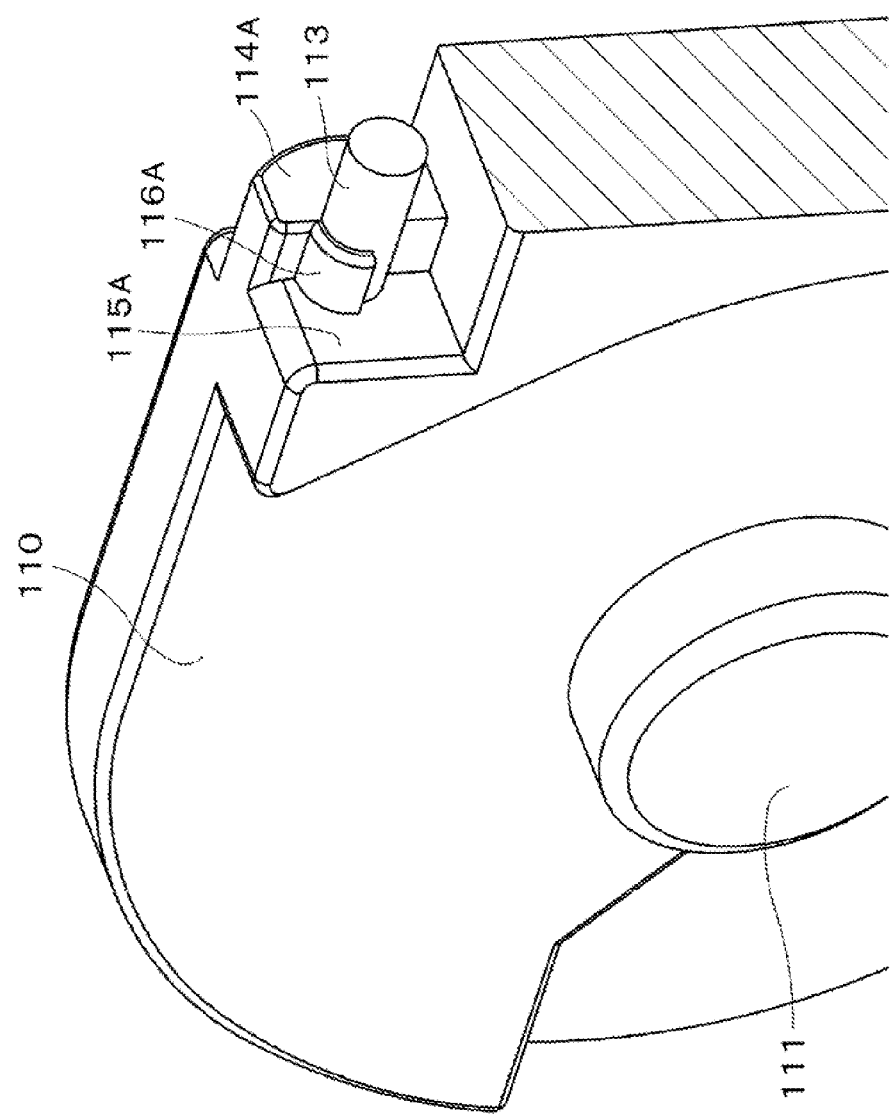
FIG. 8 is a partially sectioned, enlarged perspective view of a left side link plate of the link frame in FIG. 2.
Figure 9:
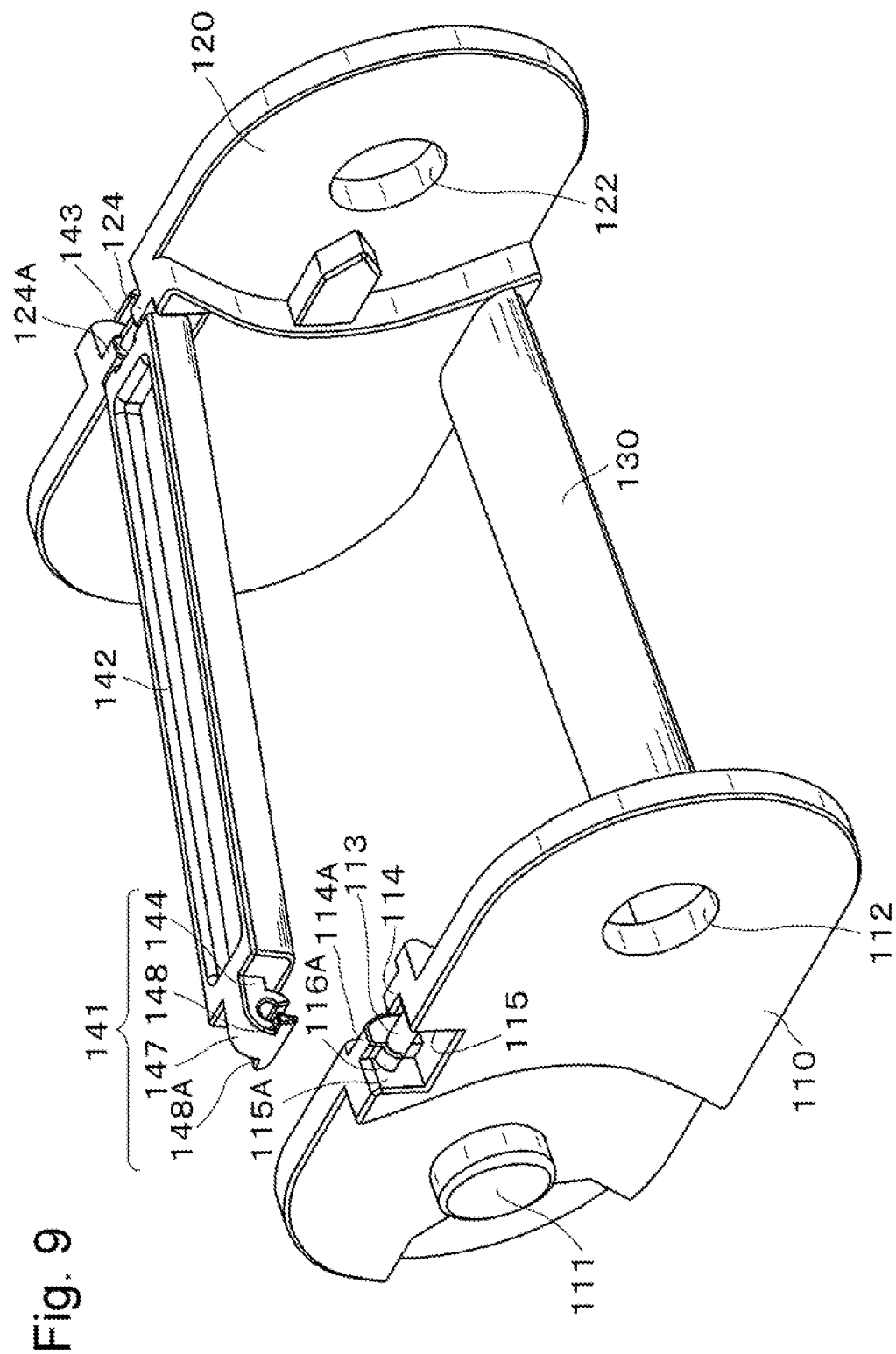
FIG. 9 is a perspective view illustrating attachment and operation of the connecting arm of the link frame in FIG. 2.

As shown in FIGS. 8 and 9, the left link plate 110 to which the hook portion 141 of the connecting arm 140 is anchored includes an engaging shaft 113 engageable with the engaging circular arc portion 147 of the hook portion 141 of the connecting arm 140 on the flexional outer peripheral side 190. The left link plate 110 includes engaging step portions 116, 116A engageable with engaging projecting portions 148, 148A of the hook portion 141 of the connecting arm 140.

The left link plate 110 is also provided with side abutting walls 115, 115A which abut engaging projecting portions 148, 148A of the hook portion 141 of the connecting arm 140. The left side 110 link plate includes engaging step portions 116, 116A and end surface abutting walls 114, 114A. See FIG. 11. End surface 145 of the arm body 142 abuts end surface abutting walls 114, 114A. The end surface abutting walls 114 and engaging shaft 113 form a fitting groove 117 (see FIG. 10) that has substantially the same width of the hook portion 141 and neck portion 144 and into which the hook portion 141 and neck portion 144 are inserted.

The right side 120 link plate to which the hinge portion 143 of the connecting arm 140 is anchored has the same horizontally symmetrical structure as the left side link plate 110 on the flexional outer peripheral side 190. The right side 120 link plate includes engaging shaft 123, engagement step portions 126, side abutting walls 125, 125A end surface abutting walls 124, 124A and a fitting groove 127.

Figure 10:
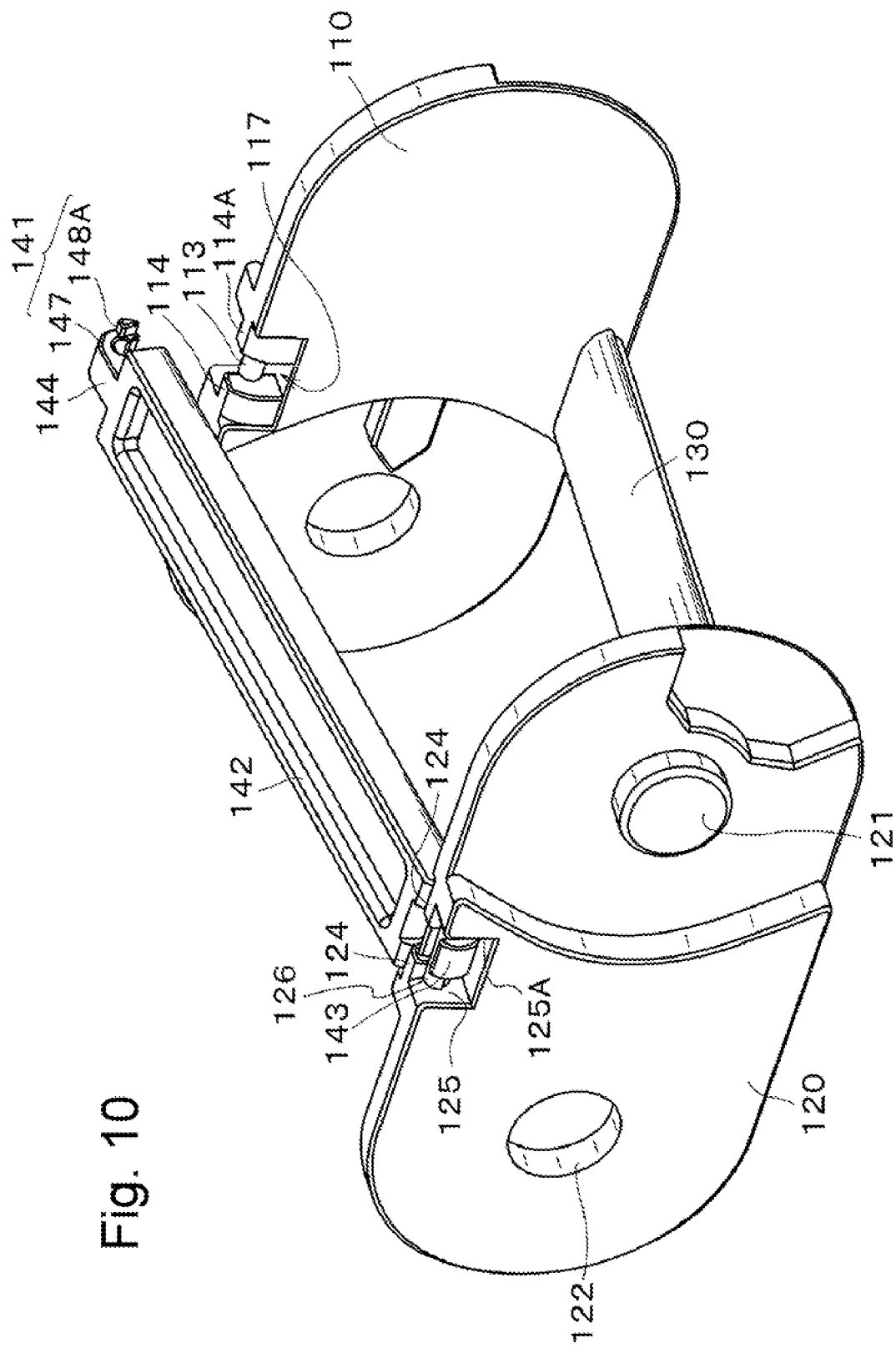
FIG. 10 is a perspective view of the connecting arm of the link frame from another direction.

Assembly of the link frame 101 and operation of the link frame 101 of the cable protection and guide device 100 constructed as described above will be explained. As shown in FIGS. 9 and 10, the hinge portion 143 of the connecting arm 140 is engaged with engaging shaft 123 on the flexional outer peripheral side 190 of the link plate 120. Connecting arm 140 is hinged on the engaging shaft 123 until the engaging circular arc portion 147 of the hook portion 141 of the connecting arm 140 engages engaging shaft 113 provided in the flexional outer periphery 190 of the link plate 110.

The flexional outer peripheral sides of the end surface abutting walls 124, 124A of the link plate 120 with which the hinge portion 143 of the connecting arm 140 engages are curved centering on the engaging shaft 123. The hinge-side end surface 145A of the arm body 142 does not collide with the engaging shaft when the connecting arm 140 is rotated during assembly of the link frame 101.

Figure 11:
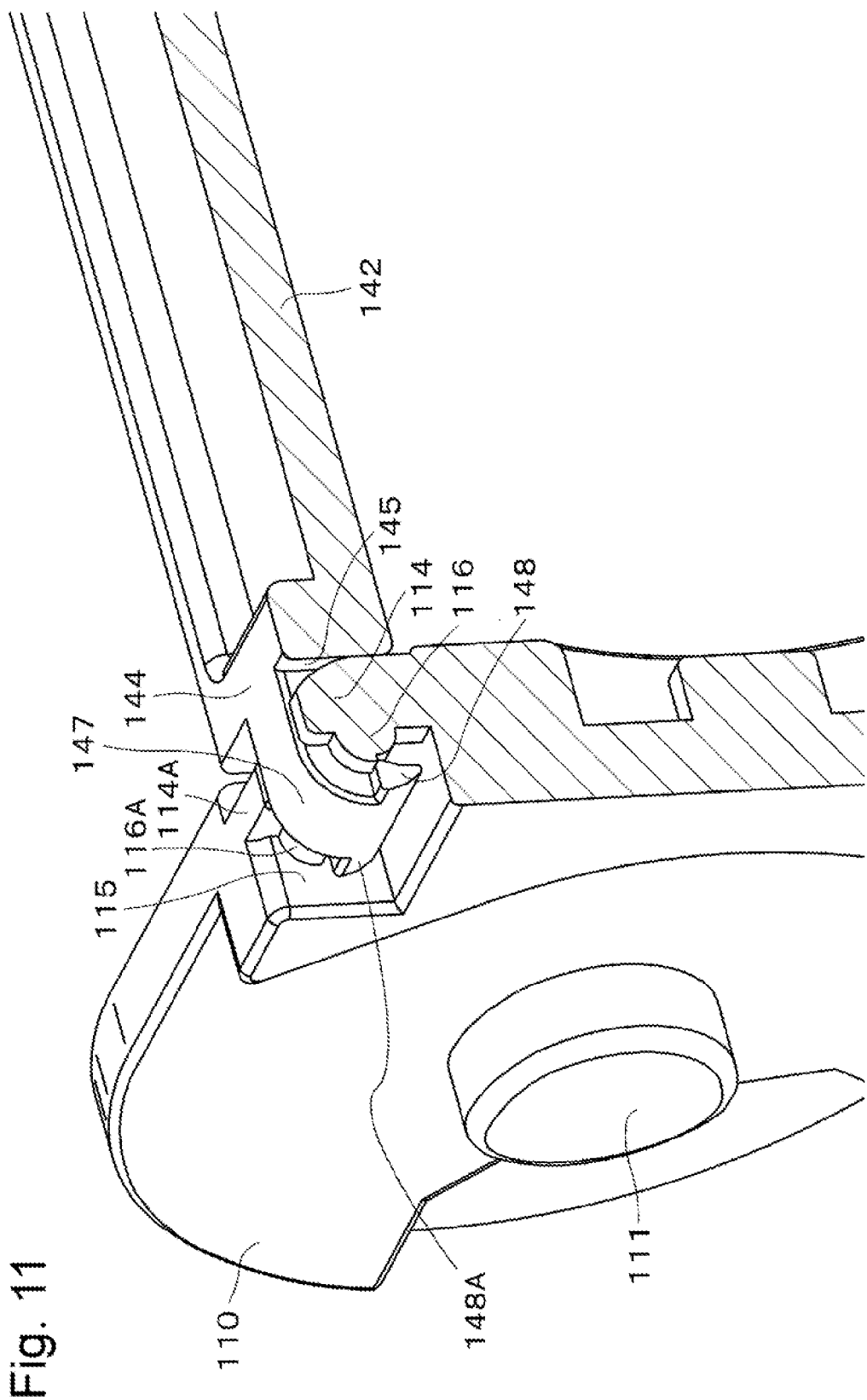
FIG. 11 is a partially sectioned, enlarged perspective view showing an engagement state of the hook portion of the link frame in FIG. 2.

Connecting arm 140 is anchored to the flexional outer periphery 190 of the pair of right 120 and left 110 link plates through engagement of the engaging projecting portions 148, 148A of the hook portion 141 of the connecting arm 140 with engaging step portions 116, 116A of the engaging shaft 113 on the flexional outer periphery 190 of the link plate 110 as shown in FIG. 11. Still referring to FIG. 11, the engaging projecting portions (148, 148A) of the hook portion which extend from the circular arc portion, snap-fit and interlock with the engaging step portions (116, 116A) of the engaging shaft of the left link plate securing the connecting arm to the link plate. Still referring to FIG. 11, engaging projections 148, 148A are illustrated under the lip of engaging step portions 116, 116A. The unnumbered lip of the engaging step portion 116A is also shown in FIG. 8

Figure 12:
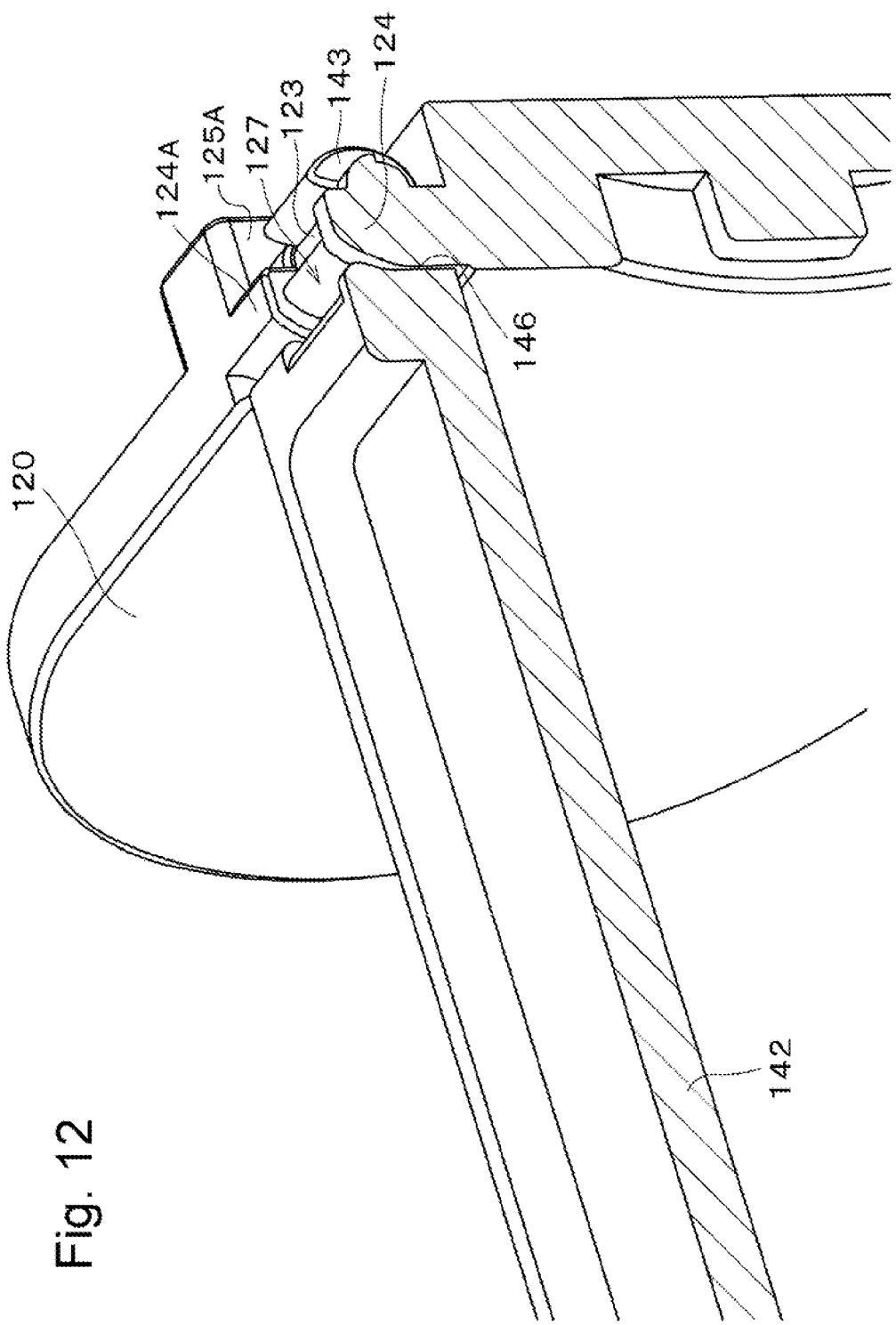
FIG. 12 is a partially sectioned, enlarged perspective view of the hinge portion of the link frame in FIG. 2.

The ringed cut portion of the hinge portion 143 of the connecting arm 140 is located in the upper part in the anchored state as shown in FIG. 12. The hinge portion 143 will never be disengaged even if the connecting arm 140 is pressed upwardly. The hook portion 141 of the connecting arm 140 can also rigidly resist disengagement if the connecting arm 140 is pressed upwardly because engaging projecting portions 148, 148A of the hook portion 141 engage with engaging step portions 116, 116A provided on the engaging shaft 113 on the flexional outer periphery 190 of the left side link plate 110 as shown in FIG. 11. Accordingly, it is possible to prevent the connecting arm 140 from being disengaged upwardly from the pair of right 120 and left 110 link plates and to steadily protect and guide the cable. Referring to FIGS. 8 and 11, it will be noticed that step portions 116, 116A and projecting portions 148, 148A interengage and lock the hook portion to left link plate 110.

The engaging projecting portions 148, 148A extend from the edge of the engaging circular arc portion 147 of the hook portion 141 as shown in FIG. 11 and engage step portions 116, 116A and lock the connecting arm to the left link plate 110. Further, the connecting arm 140 is anchored to the link plate 110 through abutment with the side abutting walls 115 residing adjacent engaging step portions 116, 116A of the link plate 110. Accordingly, even if a twisting force is applied to the link frame 101, the engaging projecting portions 148, 148A counteract the twisting force, so that it is possible to reduce torsional deformation of the link frame 101 and to smoothly flex the cable protection and guide device 100.

Arm body 142 has a greater width wider than the hook portion 141. Arm body 142 is integral with the hook portion 141. The neck portion 144 is integral with the hook portion 141 and the arm body 142. Neck portion 144 has the same width as the hook portion 141. Neck portion 144 is thinner than the arm body 142. The hook-side end surface 145 of the arm body 142 abuts with the end surface abutting walls 114 provided on the inner side of the link plate 110. Hook portion 141 and the neck portion 144 are inserted into the fitting grooves 117 on the end surface abutting walls 114, 144A. Even if link frame 101 is twisted, the cable protection and guide device 100 resists torsional deformation because the connecting arm is well fitted and releasably locked to the side plate.

Arm body 142 is formed to have a width greater than hinge portion 143 as shown in FIG. 12. Connecting arm 140 is integral with hinge portion 143. Hinge portion 143 has the same width as the neck portion. Hinge portion 143 is thinner than the arm body 142. Hinge portion 143 and neck portion 144 are inserted into the fitting groove 127 on the end surface abutting walls 124, 124A. Even if link frame 101 is twisted, the cable protection and guide device 100 resists torsional deformation because the connecting arm is well fitted to the right side plate.

Figure 13:
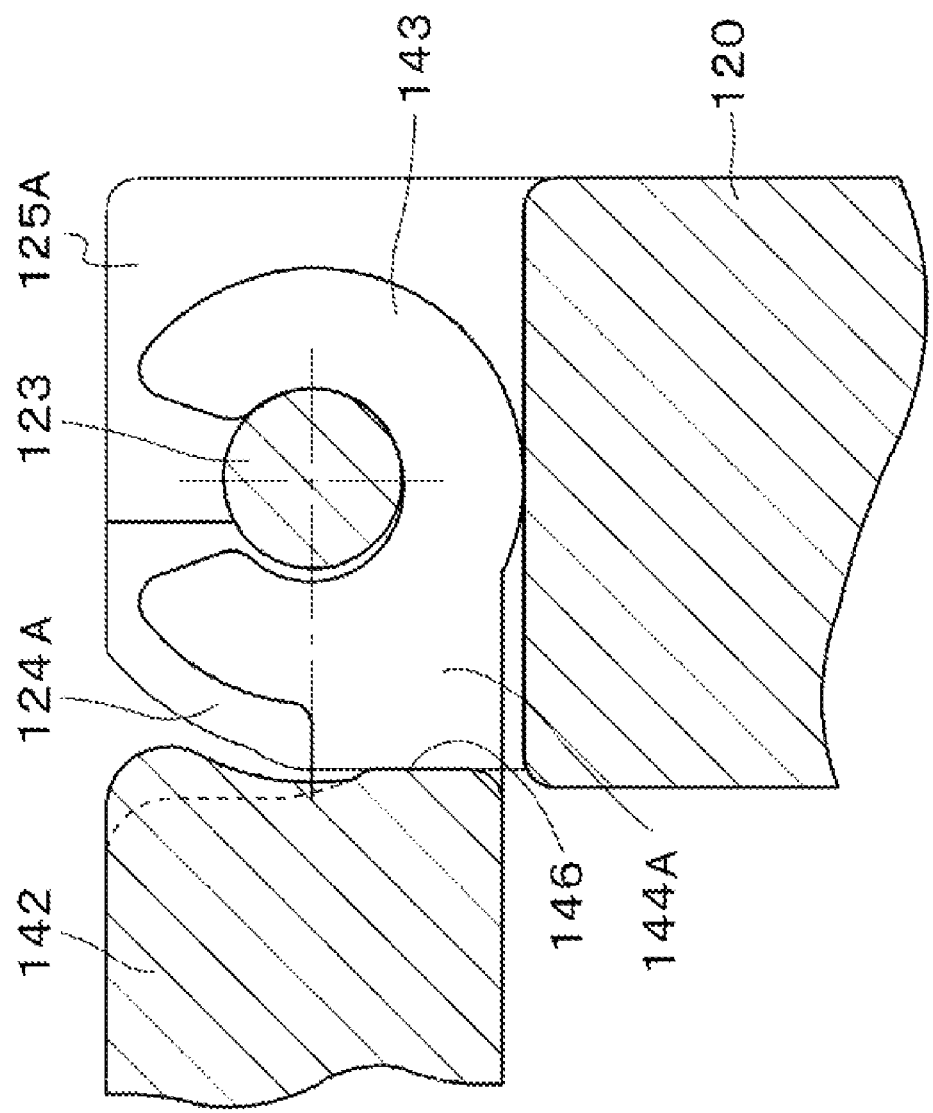
FIG. 13 is a partially sectioned, side view showing the engagement state of the hinge portion in FIG. 2.
Figure 14:
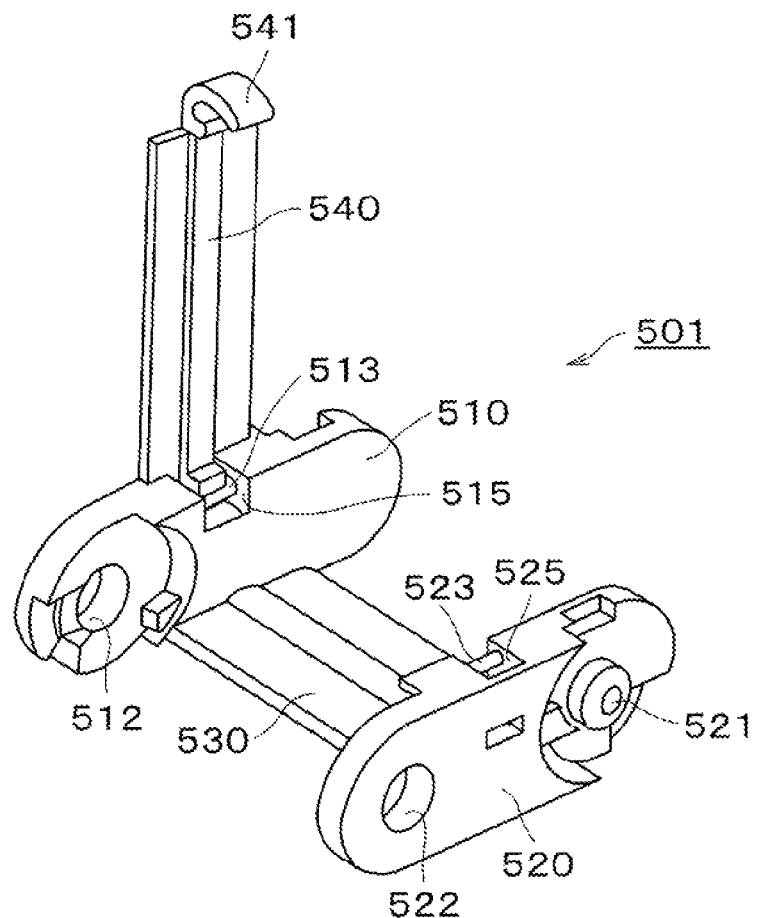
FIG. 14 is a perspective view of a link frame of a prior art cable or the like protecting and guiding device.
Figure 15:
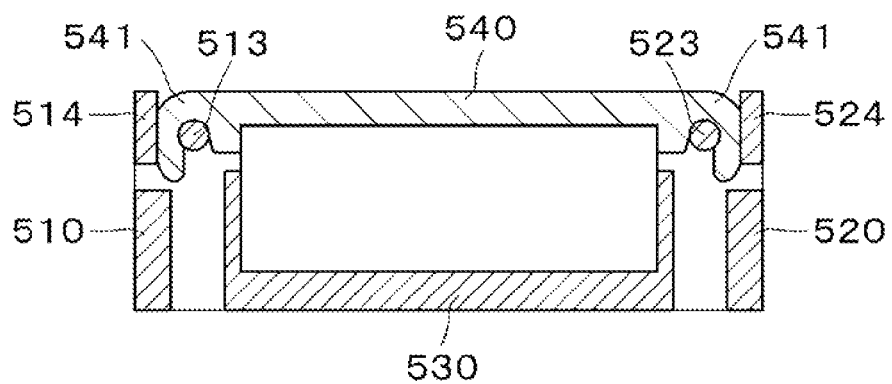
FIG. 15 is a section view of the link frame of the prior art cable or the like protecting and guiding device.

Arm body 142 includes a projecting convex portion 146 on the hinge-side end surface 145A. Hinge portion 143 is slightly deformed when pulled by the engaging shaft 123 as shown in FIG. 13. Hinge portion 143 is rigidly anchored to the engaging shaft 123. The hinge-side end surface 145A of the arm body 142 also strongly abuts with the end surface abutting walls 124, 124A. Even if link frame 101 is twisted, the cable protection and guide device 100 reduces the torsional deformation of the link frame 101.

As described above, the cable protection and guide device of the invention brings about remarkable advantageous effects of rigidly anchoring and of preventing the connecting arm from being disengaged upwardly. Thus, the cable protection and guide device reduces the torsional deformation the link frame.

It is noted that although the hook portion 141 side of the connecting arm 140 is anchored to the link plate 110 and the hinge portion 143 side of the connecting arm 140 is anchored to the link plate 120 in the embodiment described above, it is possible to anchor the hinge portion 143 and the hook portion 141 of the connecting arm 140 to either one of the pair of right and left link plates 110 and 120.

The upper surface of the arm body 142 of the connecting arm 140 is level with the upper surface of the hook portion 141 and neck portion 144. The end surface of the flexional outer peripheral side of the pair of right and left link plates 110 and 120 is level with the upper surface of the connecting arm 140 when the connecting arm 140 is anchored to the pair of right 120 and left 110 link plates. The device 100 smoothly operates even when the flexional outer peripheral side of the device 100 slidably contacts with a guide member or the like.

The circular arc of the engaging circular arc portion 147 is formed to be larger than a semicircle. The engaging circular arc portion 147 engages with the engaging shaft 113 with its elasticity and anchors the connecting arm 140 rigidly with the link plate 110. The circular arc of the hinge portion 143 is also formed to be larger than a semicircle. The hinge portion 143 engages with the engaging shaft 123 and, with its elasticity, it is difficult to disengage even though the connecting arm 140 is being twisted.

The connecting plate 130 is integrally formed with the pair of right 120 and left 110 link plates. Link frame 101 is comprised of two parts in the embodiment described above. The connecting plate may be formed to have an appropriate structure (similar to the structure of the connecting arm 140) that may be removably attached. Referring to FIG. 2, those skilled in the art will readily recognize that the connecting arm 140 extending from plate 120 to plate 110 may replace the connecting plate 130 as illustrated in FIG. 2. In other words, two connecting arms 140 may be used in each link frame. This would enable maintenance from either the outer peripheral side 190 or the inner peripheral side 180. See FIG. 1 wherein the inner 180 and outer peripheral side 190 are shown. In other words, one link frame in this alternative embodiment includes two link plates 110, 120 and two connecting arms 140, 140. Further, those skilled in the art will readily recognize that use of a second connecting arm 140 will be in conjunction with a second engaging shaft having engaging step portions located on the outer peripheral side portions thereof. The second connecting arm 140 is identical to the first connecting arm 140 and the connection structure and method of connecting the second connecting arm 140 to the plate 110 is the same as previously described herein. It will also be noticed that the orientation of the connecting arms 140, 140 may be reversed. For instance, the hook portion may mate with an engaging shaft located on the right plate 120. Sometimes as used herein, the plates are referred to as the "one" plate and the "other" plate instead of as the left plate and the right plate.

DESCRIPTION OF REFERENCE NUMERALS 100, 500 cable protection and guide device
101, 501 link frame
110, 510 link plate
111, 511 link pin
112, 512 link pin hole
113, 513 engaging shaft
114, 114A, 514 end surface abutting wall
115, 115A, 515 side abutting wall
116, 116A engaging step portions
117 fitting groove
120, 520 link plate
121, 521 link pin
122, 522 link pin hole
123, 523 engaging shaft
124, 124A, 524 end surface abutting wall
125, 525 side abutting wall
126, engaging step portion
127 fitting groove
130, 530 connecting plate
140, 540 connecting arm
141, 541 hook portion
142 arm body
143 hinge portion
143A—cut (an opening) in the ringed upper part of the circular arc shaped hinge portion
144, 144A neck portion
145, 145A arm body end surface
146, 146A projecting convex portion
147 engaging circular arc portion
147A—cut (an opening) in the ringed lower part of the circular arc shaped hinge portion
148, 148A engaging projecting portion
180 inner peripheral portion of side link plate
190 outer peripheral portion of side link plate Those skilled in the art will recognize that the invention has been set forth by way of example and that changes may be made to the invention as set forth herein without departing from the spirit and the scope of the invention as set forth in the claims hereinbelow.

The invention claimed is:

1. A cable protection and guide device, comprising:
a large number of link frames;
each link frame includes:
a pair of spaced apart right and left link plates, each of said right and left link plates includes a flexional inner peripheral side and a flexional outer peripheral side, each of said right and left link plates includes link pins and link pin holes; said right and left link plates of said link frames are flexibly connected to each other by means of link pins and link pin holes;
said left link plate includes an engaging shaft, said engaging shaft of said left link plate extends in the longitudinal direction of said link frame;
said left link plate includes engaging step portions on said engaging shaft;
each of said link frames includes a connecting plate extending across said flexional inner peripheral sides of said left and right link plates and a connecting arm extending across said flexional outer peripheral sides of said link plates;
said pair of spaced apart right and left link plates, said connecting plate and said connecting arm of said link frames form a rectangular cable storing space;
said connecting arm includes an arm body;
said connecting arm includes a hook portion at a first end of said arm body;
said connecting arm includes a hinge portion at a second end of said arm body;
said hook portion includes an engaging circular arc portion, said hook portion includes engaging projecting portions extending from said circular arc portion;
said hinge portion of said connecting arm engages said right link plate of said link frame;
said circular arc portion of said hook portion includes a cut therein, said circular arc portion interengages said engaging shaft of said left link plate; and,
said engaging projecting portions of said hook portion extending from said circular arc portion interengage said engaging step portions of said engaging shaft of said left link plates securing said connecting arm.

2. The cable protection and guide device according to claim 1, wherein, each of said link frames further includes:
said left link plate has side abutting walls, said engaging projecting portions of said hook portion abut said side abutting walls.

3. The cable protection and guide device according to claim 1, wherein, each of said link frames further includes:
said right link plate includes an engaging shaft;
said hinge portion includes a circular arc having a cut therein; and,
said circular arc of said hinge portion interengages said engaging shaft of said right link plate.

4. The cable protection and guide device according to claim 1, wherein, each of said link frames further includes:
said arm body of said connecting arm has a width and a thickness;
said hook portion of said connecting arm has a width and a thickness;
said hinge portion of said connecting arm has a width and a thickness;
said arm body is integral with said hook portion and hinge portion;
said connecting arm includes a first neck portion;
said connecting arm includes a second neck portion;
said first neck portion has a width and a thickness, said second neck portion has a width and a thickness;
said width of said first neck portion is the same as said width of said hook portion;
said width of said second neck portion is the same as said width of said hinge portion;
said thickness of said first neck portion is less than said thickness of the arm body;
said thickness of said second neck portion is less than said thickness of said arm body;
said left link plate includes end surface abutting walls;
said hook side of said arm body includes end surfaces;
said end surfaces of said hook side of said arm body abut said end surface abutting walls of said left link plate;
said right link plate includes end surface abutting walls;
said hinge side of said arm body includes end surfaces;
said end surfaces of said hinge side of said arm body abut said end surface abutting walls of said right link plate;
said end surface abutting walls of said left link plate and said engaging shaft of said left link plate form a fitting groove, said fitting groove of said left link plate is substantially as wide as said hook portion and said first neck portion, said hook portion and said first neck portion are insertable in said fitting groove of said left link plate;
said end surface abutting walls of said right link plate and said engaging shaft of said right link plate form a fitting groove, said fitting groove of said right link plate is substantially as wide as said hinge portion and said second neck portion; and, said hinge portion and said second neck portion are insertable in said fitting groove of said right link plate.

5. The cable protection and guide device according to claim 1, wherein, each of said link frames further includes:
said arm body has a convex portion projecting toward said hinge portion on the hinge-side end surface, said convex portion abutting said end surface abutting walls.

6. The cable protection and guide device according to claim 1, wherein, each of said link frames further includes:
said connecting plate is integral with said pair of right and left link plates.

7. The cable protection and guide device according to claim 1, wherein, each of said link frames further includes:
said right link plate includes an engaging shaft;
said hinge portion includes a circular arc having a cut therein; and,
said circular arc engages said engaging shaft of said right link plate.

8. The cable protection and guide device according to claim 7, wherein, each of said link frames further includes:
said arm body of said connecting arm has a width and a thickness;
said hook portion of said connecting arm has a width and a thickness;
said hinge portion of said connecting arm has a width and a thickness;
said arm body is integral with said hook portion and hinge portion;
said connecting arm includes a first neck portion;
said connecting arm includes a second neck portion;
said first neck portion has a width and a thickness, said second neck portion has a width and a thickness;
said width of said first neck portion is the same as said width of said hook portion;
said width of said second neck portion is the same as said width of said hinge portion;
said thickness of said first neck portion is less than said thickness of the arm body;
said thickness of said second neck portion is less than said thickness of said arm body;
said left link plate includes end surface abutting walls;
said hook side of said arm body includes end surfaces;
said end surfaces of said hook side of said arm body abut said end surface abutting walls of said left link plate;
said right link plate includes end surface abutting walls;
said hinge side of said arm body includes end surfaces;
said end surfaces of said hinge side of said arm body abut said end surface abutting walls of said right link plate;
said end surface abutting walls of said left link plate and said engaging shaft of said left link plate form a fitting groove, said fitting groove of said left link plate is substantially as wide as said hook portion and said first neck portion, said hook portion and said first neck portion are insertable in said fitting groove of said left link plate;
said end surface abutting walls of said right link plate and said engaging shaft of said right link plate form a fitting groove, said fitting groove of said right link plate is substantially as wide as said hinge portion and said second neck portion; and, said hinge portion and said second neck portion are insertable in said fitting groove of said right link plate.

9. The cable protection and guide device according to claim 8, wherein, each of said link frames further includes:
said arm body has a convex portion projecting toward said hinge portion on the hinge-side end surface, said convex portion abutting said end surface abutting walls.

10. The cable protection and guide device according to claim 9, wherein, each of said link frames further includes:
said connecting plate is integral with said pair of right and left link plates.

11. The cable protection and guide device according to claim 2, wherein, each of said link frames further includes:
said arm body of said connecting arm has a width and a thickness;
said hook portion of said connecting arm has a width and a thickness;
said hinge portion of said connecting arm has a width and a thickness;

said arm body is integral with said hook portion and hinge portion;
said connecting arm includes a first neck portion;
said connecting arm includes a second neck portion;
said first neck portion is integral with said arm body and said hook portion of said connecting arm;
said second neck portion is integral with said arm body and said hinge portion of said connecting arm;
said first neck portion has a width and a thickness, said second neck portion has a width and a thickness;
said width of said first neck portion is the same as said width of said hook portion;
said width of said second neck portion is the same as said width of said hinge portion;
said thickness of said first neck portion is less than said thickness of the arm body;
said thickness of said second neck portion is less than said thickness of said arm body;
said left link plate includes end surface abutting walls;
said hook side of said arm body includes end surfaces;
said end surfaces of said hook side of said arm body abut said end surface abutting walls of said left link plate;
said right link plate includes end surface abutting walls;
said hinge side of said arm body includes end surfaces;
said end surfaces of said hinge side of said arm body abut said end surface abutting walls of said right link plate;
said end surface abutting walls of said left link plate and said engaging shaft of said left link plate form a fitting groove, said fitting groove of said left link plate is substantially as wide as said hook portion and said first neck portion, said hook portion and said first neck portion are insertable in said fitting groove of said left link plate;
said end surface abutting walls of said right link plate and said engaging shaft of said right link plate form a fitting groove, said fitting groove of said right link plate is substantially as wide as said hinge portion and said second neck portion; and, said hinge portion and said second neck portion are insertable in said fitting groove of said right link plate.

12. The cable protection and guide device according to claim 8, wherein, each of said link frames further includes:
said connecting plate is integral with said pair of right and left link plates.

13. A cable protection and guide device, comprising:
a link frame;
said link frame includes:
one link plate spaced apart from the other link plate, said link plates include a flexional inner peripheral side and a flexional outer peripheral side,
one of said link plates includes an engaging shaft, said engaging shaft extends in the longitudinal direction of said link frame;
said engaging shaft includes engaging step portions thereon, each of said engaging step portions include a lip thereon;
said link frame includes a connecting plate extending across said flexional inner peripheral sides of said one and said other link plates and a connecting arm extending across said flexional outer peripheral sides of said link plates;
said link plates, said connecting plate and said connecting arm of said link frame form a rectangular cable storing space;
said connecting arm includes an arm body;
said connecting arm includes a hook portion at a first end of said arm body;
said connecting arm includes a hinge portion at a second end of said arm body;
said hook portion includes an engaging circular arc portion, said hook portion includes engaging projecting portions extending from said circular arc portion;
said hinge portion of said connecting arm engages said other link plate of said link frame securing said connecting arm to said other link plate;
said circular arc portion of said hook portion includes a cut therein, said circular arc portion interengages said engaging shaft of said left link plate; and,
said engaging projecting portions of said hook portion extending from said circular arc portion snap-fit and interlock said lips of said engaging step portions of said engaging shaft of said one link plate securing said connecting arm to said one link plate.

14. A cable protection and guide device, comprising:
a link frame;
said link frame includes:
one link plate spaced apart from the other link plate, said link plates include a flexional inner peripheral side and a flexional outer peripheral side,
one of said link plates includes a first engaging shaft and a second engaging shaft, said engaging shafts extend in the longitudinal direction of said link frame;
said engaging shafts include engaging step portions thereon, each of said engaging step portions of said engaging shafts include a lip thereon;
said link frame includes a first connecting arm extending across said flexional inner peripheral sides of said link plates and a second connecting arm extending across said flexional outer peripheral sides of said link plates;
said link plates, said first connecting arm, and said second connecting arm of said link frame form a rectangular cable storing space;
each of said connecting arms includes an arm body;
each of said connecting arms includes a hook portion at a first end of said arm body;
each of said connecting arms includes a hinge portion at a second end of said arm body;
each of said hook portions includes an engaging circular arc portion, each of said hook portions includes engaging projecting portions extending from said circular arc portion;
each said hinge portions of said connecting arms engage said other link plate of said link frame securing said connecting arms to said other link plate;
each of said circular arc portions of said hook portions includes a cut therein, each of said circular arc portions interengage said engaging shafts of said one link plate; and,
each of said engaging projecting portions of said hook portions extending from said circular arc portions snap-fit and interlock said lips of said engaging step portions of said engaging shafts of said one link plate securing said connecting arms to said one link plate.

* * * * *

UNITED STATES PATENT AND TRADEMARK OFFICE
CERTIFICATE OF CORRECTION

PATENT NO. : 8,220,243 B2
APPLICATION NO. : 12/847179
DATED : July 17, 2012
INVENTOR(S) : Shoichiro Komiya et al.

It is certified that error appears in the above-identified patent and that said Letters Patent is hereby corrected as shown below:

Column 2, line 66, after "ringed upper" delete "park" and insert --part--.

Signed and Sealed this
Twenty-eighth Day of August, 2012

David J. Kappos
*Director of the United States Patent and Trademark Office*